US005756644A

United States Patent [19]
Hodge et al.

[11] Patent Number: 5,756,644
[45] Date of Patent: May 26, 1998

[54] POLYESTERS

[75] Inventors: Philip Hodge, Dolphinholme; Joseph Anthony Semlyen, Elvington; Anthony Garry Harrison, Middlesbrough, all of United Kingdom

[73] Assignee: Imperial Chemical Industries PLC, United Kingdom

[21] Appl. No.: 737,154
[22] PCT Filed: May 10, 1995
[86] PCT No.: PCT/GB95/01052
  § 371 Date: Jan. 7, 1997
  § 102(e) Date: Jan. 7, 1997
[87] PCT Pub. No.: WO95/30702
  PCT Pub. Date: Nov. 16, 1995

[30] Foreign Application Priority Data

May 10, 1994 [GB] United Kingdom ............ 9409293

[51] Int. Cl.$^6$ .................................................. C08G 63/02
[52] U.S. Cl. ................... 528/272; 528/272; 528/274; 528/298; 528/308; 528/308.6; 528/482; 528/503
[58] Field of Search ................... 528/272, 274, 528/298, 308, 308.6, 482, 503

[56] References Cited

U.S. PATENT DOCUMENTS

| | | | |
|---|---|---|---|
| 5,039,783 | 8/1991 | Brunelle et al. | 528/272 |
| 5,214,158 | 5/1993 | Brunelle et al. | 549/267 |
| 5,214,198 | 5/1993 | Brunelle et al. | 549/267 |
| 5,302,484 | 4/1994 | Odell et al. | 430/127 |
| 5,314,779 | 5/1994 | Odell et al. | 430/127 |
| 5,348,985 | 9/1994 | Pearce et al. | 521/124 |
| 5,550,173 | 8/1996 | Hammond et al. | 523/122 |

OTHER PUBLICATIONS

Hodge et al., "A Novel Approach to the Synthesis of Cyclic Oligo–and Poly–esters", J. Chem. Soc., Chem. commun., 1993, 581–583.

Hodge et al. Journal of the Chemical Solciety, Chemical Communications, 1993 Letchworth 6B, pp. 581–583, "A Novel Approach to the Synthesis of Cyclic Oligo –Poly–esters".

*Primary Examiner*—Samuel A. Acquah

[57] ABSTRACT

A process of producing a cyclic polyester oligomer mixture using a solid support system is described. A preferred cyclic polyester mixture contains at least one cyclic polyester oligomer containing 15 or more repeat units. Cyclic ethylene terephthalate oligomers are particularly preferred. The cyclic polyester oligomers may be converted to high molecular weight linear polyesters by heating in the presence of a catalyst.

10 Claims, No Drawings

POLYESTERS

This invention relates to polyesters, and in particular to aromatic cyclic polyester oligomers and to a method of production thereof.

Aromatic polyesters, such as polyethylene terephthalate, polybutylene terephthalate and polyethylene naphthalate, have been used in industrial applications for many years. Commercially available aromatic polyesters are generally produced using polycondensation reactions. The resulting polyesters predominantly contain linear chains of repeat units, but also contain very small amounts, of the order of 1 to 2%, of cyclic oligomers. These "naturally occurring" cyclic oligomers have been isolated and characterised. Generally the cyclic oligomers are low molecular weight species, principally cyclic trimer, tetramer and pentamer. Cooper and Semlyen, Polymer, 1973, Vol 14, p 185–192, describe the extraction of cyclic oligomers, containing up to 10 repeat units, from polyethylene terephthalate.

U.S. Pat. No. 5,039,783 describes a solution process of making cyclic polyester oligomers utilising an unhindered tertiary amine. The resulting cyclic polyester oligomers contain predominantly dimer, trimer, tetramer and pentamer, with the largest polyester oligomer produced containing 12 repeat units. The yield of cyclic oligomers produced in U.S. Pat. No. 5,039,783 is relatively low. In addition, relatively large amounts of linear oligomers are also produced, which means that a relatively expensive extraction stage is required in order to separate the cyclic oligomers from the linear oligomers. U.S. Pat. No. 5,039,783 also describes converting the cyclic polyester oligomers to linear polyesters. The molecular weight of the linear polyesters produced from the cyclic oligomers depends, inter alia, on the molecular weight, ie the number of repeat units, of the cyclic oligomers. There is a requirement for higher molecular weight polyester and improved methods of producing high molecular weight polyester than standard linear polyester polycondensation reactions or by converting the cyclic oligomers described in U.S. Pat. No. 5,039,783 to linear polyesters.

Hodge et al, J Chem Soc Chem Commun, 1993, p 581–583, describes a method of producing aliphatic cyclic polyester oligomers using a solid support.

We have now produced an aromatic cyclic polyester composition and method of production thereof which reduces or substantially overcomes one or more of the aforementioned problems.

Accordingly, the present invention provides a composition comprising a mixture of cyclic polyester oligomers having different numbers of repeat units, wherein the mixture comprises at least one cyclic polyester oligomer containing 15 or more repeat units, and at least one of the repeat units has the formula

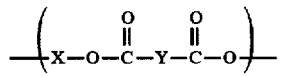

wherein X represents an alkylene radical containing 2 to 6 carbon atoms, and Y represents a phenylene radical or a naphthalene radical.

The invention further provides a method of producing cyclic polyester oligomers by (i) attaching on to a solid support a monomer containing a unit of formula

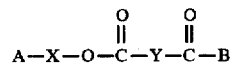

wherein X represents an alkylene radical containing 2 to 6 carbon atoms, Y represents a phenylene radical or a naphthalene radical, and one of A or B represents a leaving group and the other of A or B represents an attaching group, and (ii) heating the solid support containing the attached monomer, resulting in polymerisation, cyclisation and release from the solid support of cyclic polyester oligomers.

Cyclic polyester oligomers according to the invention contain at least one repeat unit having the formula

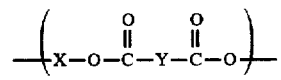

wherein X preferably represents a propylene, butylene or neopentylene radical, and more preferably an ethylene radical. Y preferably represents a m- or p-phenylene radical.

In a preferred embodiment of the invention the composition of cyclic polyester oligomers comprises greater than 30 mole %, more preferably greater than 50 mole %, particularly greater than 70 mole %, and especially greater than 90 mole % up to 100 mole % of one or more repeat units as defined herein. In a further preferred embodiment of the invention the cyclic polyester oligomers contain a single repeat unit, ie the cyclic oligomers are cyclic homo-oligomers, more preferably butylene terephthalate or ethylene naphthalate, and particularly ethylene terephthalate cyclic oligomers.

In an alternative embodiment of the invention, the cyclic polyester oligomers contain greater than one, preferably two, repeat units as defined herein. In particular, the cyclic polyester oligomers are preferably co-oligomers of ethylene terephthalate and ethylene isophthalate, especially in the molar ratios of from 50 to 90 mole % ethylene terephthalate and correspondingly from 50 to 10 mole % ethylene isophthalate. Preferred cyclic co-oligomers comprise from 65 to 85 mole % ethylene terephthalate and from 35 to 15 mole % ethylene isophthalate, and particularly a cyclic co-oligomer of about 82 mole % ethylene terephthalate and about 18 mole % ethylene isophthalate.

The composition according to the invention preferably comprises a mixture comprising at least one cyclic polyester oligomer containing 17, more preferably 19, particularly 21, and especially 23 or more repeat units. The mixture of cyclic polyester oligomers suitably comprises oligomers having from 2 to 60, preferably 3 to 50, more preferably 6 to 40, particularly 12 to 35, and especially 15 to 30 repeat units. The mixture suitably comprises greater than 5 mole %, preferably greater than 10 mole %, more preferably greater than 20 mole %, particularly greater than 35 mole %, and especially greater than 50 mole % of cyclic oligomers containing 10 or more repeat units, based on the total amount of all the cyclic oligomers present in the composition. In a particularly preferred embodiment of the invention the mixture comprises greater than 2.5 mole %, preferably greater than 5 mole %, more preferably greater than 10 mole %, particularly greater than 20 mole %, and especially greater than 30 mole % of cyclic oligomers containing 15 or more repeat units, based on the total amount of all the cyclic oligomers present in the composition.

The ratio of cyclic trimer/cyclic tetramer in the cyclic polyester oligomer mixture is preferably in the range from 5 to 1/1, more preferably 4 to 1/1, particularly 3 to 1/1, and especially 2 to 1/1.

The number average by moles of repeat units per oligomer in the cyclic polyester oligomer mixture is preferably from 4 to 25, more preferably 5 to 20, particularly 6 to 16, and especially 7 to 12.

The molecular weight of oligomers in the cyclic polyester oligomer mixture is preferably in the range from approximately 380 to 11,500, more preferably 550 to 10,000, and especially 550 to 6000. The average molecular weight of oligomers in the cyclic polyester oligomer mixture is preferably in the range from 750 to 4800, more preferably 950 to 3800, particularly 1100 to 3000, and especially 1300 to 2300.

Cyclic polyester oligomers can be prepared using a solid support. The basic principle of the technique is that monomer is attached to a solid support by means of an attaching group. The end of the monomer remote from the attaching group has a leaving group. The solid support containing the attached monomer is then heated, preferably suspended in a solvent, resulting in polymerisation by means of the attaching group of one monomer displacing the leaving group of a neighbouring monomer. The result is a linear chain which remains attached to the solid support by means of the attaching group. Under suitable conditions, the leaving group and attaching group of the same linear chain will react together to form a cyclic oligomer, which on formation is released from the solid support. In contrast, non-cyclised linear oligomers should remain attached to the solid support. The advantage of this technique is that at the end of the reaction period potentially all the unbound oligomer is cyclic. Thus, an expensive and time consuming isolation of cyclic oligomers from a cyclic/linear oligomer mixture may be omitted.

A wide range of materials may be used as a solid support, preferably particulate materials, such as glass beads or crosslinked polymers, for example polystyrene, polydextran, or polyamide. A preferred solid support is a strong-base anion exchange resin, particularly functionalised polystyrene.

A preferred monomer for attaching to the solid support contains a unit of formula

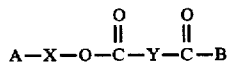

wherein X represents an alkylene radical containing 2 to 6 carbon atoms, Y represents a phenylene radical or a naphthalene radical, and one of A or B represents a leaving group and the other of A or B represents an attaching group. Preferred leaving groups include halogen radicals, mesylate and tosylate. Bromine radical is a particularly preferred leaving group. Suitable attaching groups include free functional acid groups, particularly when the solid support contains bicarbonate groups. Preferred acid groups include carboxylic acid, sulphonic acid and phosphonic acid. Alternatively, salts of the aforementioned acids may be used. In a preferred embodiment of the invention A represents the leaving group, preferably bromine radical, and B represents the attaching group, preferably a hydroxyl radical, thus forming a free carboxylic acid group at the attaching end of the monomer.

A preferred monomer is a ω-halogenocarboxylic acid, particularly terephthalic acid mono (2-bromoethyl) ester.

The monomer is suitably attached to the solid support by immersing the support in a 0.05% to 30%, preferably 0.1% to 10%, and more preferably 0.5% to 5% by weight solution of monomer in solvent, such as aqueous methanol, for example from 8 to 48 hours at ambient temperature. The solid support is then preferably separated from the monomer solution, washed with solvent, and dried. Polymerisation can be achieved by heating the monomer-loaded solid support, preferably at a temperature greater than 40° C. The polymerisation reaction generally takes place for a time period of up to 7 days, preferably up to 4 days, more preferably up to 2 days, and particularly for 8 to 24 hours. The heating temperature is more preferably in the range from 45° C. to 120° C., particularly 50° C. to 100° C., and especially 55° C. to 75° C. The monomer-loaded solid support is preferably heated when suspended in a solvent, preferably by refluxing in chloroform. The solid support can be separated from the cyclic oligomers present in the solvent by filtration. Substantially pure cyclic polyester oligomers may be obtained by evaporating off the solvent.

In a preferred embodiment of the invention, the method of producing the cyclic polyester oligomer composition is performed in a substantially methanol-free system. Thus, preferably a solvent other than methanol is used both to prepare and wash the solid support, and to attach the monomer on to the support. The polymerisation reaction is also preferably performed in a solvent other than methanol. Similarly, it is preferred that the method of producing the cyclic polyester oligomer composition is performed in a substantially non-aqueous system. Preferred solvents for attaching the monomer on to the support and/or for performing the polymerisation reaction include chloroform and tetrachloroethane.

An advantage of using the solid support as described herein is that cyclic polyester oligomers may be obtained essentially free of monomer or of linear polyester oligomers, without having to use an additional isolation stage. Thus, a preferred composition according to the invention comprises greater than 50%, more preferably greater than 70%, particularly greater than 90%, and especially greater than 95% by weight of cyclic polyester oligomers based on the total weight of cyclic polyester oligomers, linear polyester oligomers and monomer present in the composition. Correspondingly, a preferred composition comprises less than 50%, more preferably less than 30%, particularly less than 10%, and especially less than 5% by weight of linear polyester oligomers and/or monomer based on the total weight of cyclic polyester oligomers, linear polyester oligomers and monomer present in the composition.

The method of producing cyclic polyester oligomers is capable of very high yields, preferably greater than 40%, more preferably greater than 60%, particularly greater than 80%, and especially greater than 90% by weight of cyclic polyester oligomers compared to the total weight of monomer used, ie the weight of monomer attached to the solid support.

The cyclic polyester oligomers described herein may be converted to high molecular weight linear polyesters by heating in the presence of a catalyst. Suitable catalysts include polycondensation catalysts used in the polymerisation of linear polyesters, such as metal oxides, organotin compounds, metal salicylates and stannous alkoxides. The cyclic polyester oligomers may be used in a wide variety of ways to produce moulded thermoplastic articles, such as blow-moulded bottles, sheets, oriented films etc. The relatively low viscosity of the cyclic polyester composition is potentially a particular advantage in moulding applications.

The invention is illustrated by reference to the following Example.

Example 1

Terephthalic acid mono (2-bromoethyl) ester monomer was prepared as follows:

4-Chlorostyrene (supplied by Aldrich Chemical Co.) was treated with magnesium in anhydrous tetrahydrofuran and the resulting Grignard reagent was quenched with solid carbon dioxide. Recrystallisation from aqueous ethanol produced white platelets of 4-vinyl benzoic acid. 4-Vinyl benzoic acid was treated with thionyl chloride to form the acid chloride, which was esterified without further purification by reaction with 2-bromoethanol and triethylamine in anhydrous ether. The resultant ester ((2-bromoethyl) 4-vinyl benzoate) was treated with ozone in dichloromethane. Oxidative work up with hydrogen peroxide yielded terephthalic acid mono (2-bromoethyl) ester.

Amberlyst A-26 ion-exchange resin (supplied by Janssen Chimica) was converted from the chloride form (P—N$^+$(CH$_3$)$_3$Cl$^-$) to the bicarbonate form (P—N$^+$(CH$_3$)$_3$HCO$_3^-$) by ion-exchange using an aqueous saturated potassium hydrogen carbonate solution. The bicarbonated resin (1.3 g) was added to terephthalic acid mono (2-bromoethyl) ester (1 g) in 150 ml methanol and the mixture stirred for 24 hours at room temperature. The resin was collected by vacuum filtration, washed with methanol, deionised water and acetone and partially dried on the filter. The monomer-loaded resin was further dried at 14 mm Hg and then under high vacuum (0.1 mm Hg). 1.84 g of monomer loaded resin was refluxed in 150 ml chloroform for 7 days. The resin was collected by filtration and washed with 50 ml of hot chloroform. The product solution and washings were combined and evaporated to dryness to yield the mixture of cyclic polyester oligomers.

The cyclic polyester oligomer mixture was analysed by
(i) analytical gel permeation chromatography (GPC) using a Knauer HPLC/GPC equipped with four PL-gel 3 μm mixed-E size exclusion columns in series and a guard column (both supplied by Polymer Laboratories Ltd). A Shimadzu R1D-6A differential refractometer was used as the detector. Analytical grade chloroform was used as the eluent at a flow rate of 0.3 ml min$^{-1}$.
(ii) field desorption mass spectrometry using a VG Analytical Ltd. ZAB-2SE mass spectrometer of reverse geometry.

The results indicated the presence of cyclic ethylene terephthalate oligomers containing from 3 up to at least 18 repeat units. The mixture contained approximately at least 5 mole % of cyclic oligomers containing 10 or more repeat units, and approximately at least 2.5 mole % of cyclic oligomers containing 15 or more repeat units. The number average by moles, to the nearest whole number, of repeat units per oligomer in the cyclic oligomer mixture was approximately at least 5. The ratio of cyclic trimer/cyclic tetramer in the cyclic oligomer mixture was approximately 2 to 1.

I claim:

1. A composition comprising a mixture of cyclic polyester oligomers having different numbers of repeat units, wherein the mixture comprises at least one cyclic polyester oligomer containing 15 or more repeat units, and at least one of the repeat units has the formula

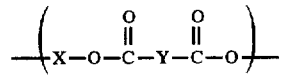

wherein X represents an alkylene radical containing 2 to 6 carbon atoms, and Y represents a phenylene radical or a naphthalene radical.

2. A composition according to claim 1 comprising at least one cyclic polyester oligomer containing 17 or more repeat units.

3. A composition according to claim 1 comprising greater than 5 mole % of cyclic polyester oligomers containing 10 or more repeat units, based on the total amount of all the cyclic polyester oligomers present in the composition.

4. A composition according to claim 1 wherein the ratio of cyclic trimer/cyclic tetramer in the cyclic polyester oligomer mixture is in the range from 5 to 1/1.

5. A composition according to claim 1 wherein the number average by moles of repeat units per cyclic polyester oligomer in the composition is from 4 to 25.

6. A composition according to claim 1 comprising cyclic ethylene terephthalate oligomers.

7. A method of producing cyclic polyester oligomers by (i) attaching on to a solid support a monomer containing a unit of formula

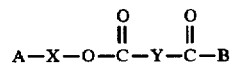

wherein X represents an alkylene radical containing 2 to 6 carbon atoms, Y represents a phenylene radical or a naphthalene radical, and one of A or B represents a leaving group and the other of A or B represents an attaching group, and (ii) heating the solid support containing the attached monomer, resulting in polymerisation, cyclisation and release from the solid support of cyclic polyester oligomers.

8. A method according to claim 7 wherein a substantially methanol-free system is used.

9. A method according to claim 7 wherein the solid support is a strong-base anion exchange resin.

10. A method according to claim 7 wherein the monomer is both attached on to the solid support and polymerised on the support, in the presence of chloroform.

* * * * *